United States Patent [19]
Dobreski

[11] Patent Number: 4,743,649
[45] Date of Patent: May 10, 1988

[54] FILMS OF LINEAR ETHYLENE POLYMER AND HIGH IMPACT POLYSTYRENE

[75] Inventor: David V. Dobreski, Fairport, N.Y.

[73] Assignee: Mobil Oil Corporation, New York, N.Y.

[21] Appl. No.: 902,718

[22] Filed: Sep. 2, 1986

[51] Int. Cl.$^4$ .................... C08L 51/04; C08L 23/18; C08L 23/20
[52] U.S. Cl. .......................... 525/86; 525/70
[58] Field of Search .......................... 525/86

[56] References Cited

U.S. PATENT DOCUMENTS

| | | | |
|---|---|---|---|
| 4,255,531 | 3/1981 | Arbit | 525/237 |
| 4,306,049 | 12/1981 | Prapas | 526/347 |
| 4,386,188 | 5/1983 | Grancio et al. | 525/96 |
| 4,495,323 | 1/1985 | Collins | 525/89 |
| 4,503,187 | 3/1985 | Gunesin et al. | 525/71 |
| 4,579,912 | 4/1986 | Canterino et al. | 525/240 |

FOREIGN PATENT DOCUMENTS 1031132  5/1966  United Kingdom ................ 525/86

*Primary Examiner*—Carman J. Seccuro
*Attorney, Agent, or Firm*—Alexander J. McKillop; Michael G. Gilman; Charles J. Speciale

[57] ABSTRACT

Films of linear ethylene polymers, particularly copolymers of ethylene and alpha-olefins of 4 to 10 carbon atoms (LLDPE), containing up to about 15 weight percent of an impact polymer, e.g. impact polystyrene, exhibit excellent film properties and improved blocking.

14 Claims, No Drawings

FILMS OF LINEAR ETHYLENE POLYMER AND HIGH IMPACT POLYSTYRENE

BACKGROUND OF THE INVENTION

Linear ethylene polymers, particularly linear low density polyethylene (LLDPE) are widely used commercially in films. The films are conventionally prepared by blown film extrusion and have generally good properties but often exhibit undesirably low stiffness for some uses and have marginal machine direction tear and puncture tear propagation characteristics. U.S. Pat. No. 4,579,912, which is incorporated by reference, discloses the use of polystyrene or poly(para-methylstyrene) to improve tear strength. It was subsequently found that the addition of polystyrene resin also improved the blocking characteristics and reduced the splittiness as measured by machine direction puncture propogation of the film making it particularly suitable for bags and the like. This invention is based on the observation that better blocking characteristics than obtained with polystyrene addition can be achieved using an impact polystyrene or impact poly(para-methylstyrene) resin while largely retaining the other important physical properties of the film, especially reduced splittiness.

SUMMARY OF THE INVENTION

Films prepared from linear ethylene polymers, particularly linear ethylene copolymers of ethylene and alpha-olefins having 4 to 10 carbon atoms, are blended with up to about 15 weight percent of an impact polystyrene or impact poly(para-methylstyrene) containing 1 to 20 weight percent of rubber.

DETAILED DESCRIPTION OF THE INVENTION

The major component of the films of this invention is a linear polymer of ethylene having a density of from about 0.85 to about 0.96 and can be a homopolymer or a copolymer. Suitable copolymers are copolymers of ethylene and alpha-olefins containing 4 to 10 carbon atoms. Polymers having a density between 0.90 and 0.94, preferably between 0.91 and 0.93, referred to as linear low density polyethylenes, (LLDPE) are particularly suitable. Copolymers of ethylene and 1-butene, 1-hexene, 1-octene and 4-methyl-1-pentene are commercially important, and widely available.

The impact polymers which are used in this invention are also commercially available. Suitable impact polymers are prepared by polymerizing styrene or paramethylstyrene monomer in the presence of a rubber such as polybutadiene with a free radical catalyst such as benzoylperoxide under conditions which promote grafting of polystyrene or poly(para-methylstyrene) onto the rubber backbone. The rubber generally comprises 1 to 20 weight percent, preferably 4 to 10 weight percent of the polymer. Impact polymers containing high rubber contents, e.g., 18 weight percent and 5 micron particles give films with excellent blocking but result in reduced modulus (stiffness). Therefore, if high modulus is desired, impact polymers with rubber contents below about 10 weight percent are desirable. Polybutadiene is the preferred rubber but other rubbers and rubbery polymers and copolymers can be used as the backbone of the impact polymer. Impact resins of polystyrene and the like can vary considerably, not only in the rubber content but also in the particle size of the dispersed rubber particles. Generally, particle diameters of 2 to 20 microns are suitable but it has been found that larger particle sizes in excess of 4 microns are advantageous and such impact polymers are therefore preferred.

The impact polymer can comprise up to about 15 weight percent or even more of the composition. However, the character of the film changes markedly when amounts much larger than about 10 weight percent of the impact polymer are present. At amounts below about 10 weight percent, for example at 5 weight percent, the film exhibits excellent physical properties such as tear strength. At higher amounts, for example at 15 weight percent of a HIPS resin having a low rubber content, the film is somewhat stiffer and has the tear and fold characteristics of paper. At either high or low levels the film exhibits good blocking which is considered an important advantage of this invention over known films where polystyrene is used as an additive instead of the impact polystyrene.

The unexpectedly good blocking characteristics of the films of this invention and their other physical properties make the films particularly suitable for the production of thin bags of a gauge of less than 1 mil. The superior blocking qualities of the bags contributes to their easy opening characteristics, an important consideration during use. Also, because the blocking characteristics are improved, it is possible to decrease or remove conventional inorganic anti-block agents which are generally detrimental to physical properties, add high impact polymer and produce a film with better ultimate tensile, puncture and MD tear strength than virgin LLDPE with inorganic anti-block agent.

The invention is illustrated by the following non-limiting examples in which all parts are by weight unless otherwise indicated.

EXAMPLES 1-3

Films were produced by dry blending LLDPE and PS or HIPS at the extruder hopper. Blown (0.75–0.80 mil) film was produced using the standard blown film extrusion process.

The films were evaluated for blocking after conditioning at 50 psi and at 140° F., for 24 hours, and for machine direction puncture propogation tear (MD PPT) which is regarded as a measure of the splittiness of the films.

| Example | Composition | Blocking (g) | MD PPT Tear (cm) |
| --- | --- | --- | --- |
| C-1 | LLDPE (0.922 g/cc) | 101 | 4.9 |
| C-2 | LLDPE + 5% PS | 96 | 4.7 |
| 1* | LLDPE + 5% HIPS | 66 | 4.2 |
| C-3 | LLDPE (0.928 g/cc) | 97 | 7.7 |
| C-4 | LLDPE + 3% PS | 79 | 6.7 |
| 2* | LLDPE + 3% HIPS | 66 | 6.7 |
| C-5 | LLDPE (0.922 g/cc) | 119 | 5.0 |
| C-6 | LLDPE + 3% PS | 112 | 4.8 |
| 3* | LLDPE + 3% HIPS | 85 | 5.0 |

*Examples of this invention.

LLDPE (0.922 g/cc) is an ethylene-octene copolymer. Melt Index 0.7.
LLDPE (0.928 g/cc) is an ethylene-octene copolymer. Melt Index 1.0.
PS is a crystal polystyrene resin, Mobil 1240.
HIPS is a high impact polystyrene in which the rubber is polybutadiene (about 8 weight percent) and an average rubber particle size of about 4.5 microns.

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

I claim:

1. A film comprising a linear copolymer of ethylene and an alpha-olefin having 4 to 10 carbon atoms having a density of less than 0.94 which has blocking tendencies in film form and from 1 up to about 15 weight percent of an impact polymer which is an impact polystyrene or impact poly(para-methylstyrene) containing 1 to 20 weight percent of rubber; said film having reduced blocking compared to a film containing said copolymer of ethylene and the same amount of polystyrene.

2. The film of claim 1 in which said impact polymer comprises up to 8 percent by weight of the composition.

3. The film of claim 1 in which said impact polymer is impact polystyrene and said rubber is polybutadiene.

4. The film of claim 1 in which said impact polymer contains rubber particles having an average particle diameter of 2 to 20 microns.

5. The film of claim 3 in which said impact polymer contains rubber particles having an average particle diameter of 2 to 20 microns.

6. The film of claim 1 in which said linear ethylene polymer is a copolymer of ethylene and butene, said impact polymer is impact polystyrene and said rubber is polybutadiene.

7. The film of claim 1 in which said linear ethylene polymer is a copolymer of ethylene and hexene, said impact polymer is impact polystyrene and said rubber is polybutadiene.

8. The film of claim 1 in which said linear ethylene polymer is a copolymer of ethylene and octene, said impact polymer is impact polystyrene and said rubber is polybutadiene.

9. The film of claim 4 in which said linear ethylene polymer is a copolymer of ethylene and butene, said impact polymer is impact polystyrene and said rubber is polybutadiene.

10. The film of claim 4 in which said linear ethylene polymer is a copolymer of ethylene and hexene, said impact polymer is impact polystyrene and said rubber is polybutadiene.

11. The film of claim 4 in which said linear ethylene polymer is a copolymer of ethylene and octene, said impact polymer is impact polystyrene and said rubber is polybutadiene.

12. The film of claim 1 which contains 4 to 10 weight percent rubber.

13. The film of claim 1 in which said impact polymer is impact polystyrene.

14. The film of claim 1 in which said impact polymer is impact poly(para-methylstyrene).

* * * * *